US011267573B2

(12) United States Patent
Wakatsuki et al.

(10) Patent No.: US 11,267,573 B2
(45) Date of Patent: Mar. 8, 2022

(54) SMALL FLYING VEHICLE EQUIPPED WITH AIRBAG DEVICE

(71) Applicant: DAICEL CORPORATION, Osaka (JP)

(72) Inventors: Akihiro Wakatsuki, Tokyo (JP); Tomomi Akiba, Tokyo (JP); Takao Kuroda, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 358 days.

(21) Appl. No.: 16/329,892

(22) PCT Filed: Aug. 15, 2017

(86) PCT No.: PCT/JP2017/029349
§ 371 (c)(1),
(2) Date: Mar. 1, 2019

(87) PCT Pub. No.: WO2018/043116
PCT Pub. Date: Mar. 8, 2018

(65) Prior Publication Data
US 2020/0231291 A1    Jul. 23, 2020

(30) Foreign Application Priority Data

Sep. 2, 2016   (JP) .............................. JP2016-172054

(51) Int. Cl.
*B64D 25/00*    (2006.01)
*B64C 39/02*    (2006.01)
*B64D 47/08*    (2006.01)

(52) U.S. Cl.
CPC ............ *B64D 25/00* (2013.01); *B64C 39/024* (2013.01); *B64D 47/08* (2013.01);
(Continued)

(58) Field of Classification Search
CPC ................ B60R 21/268; B60R 21/274; B64C 2201/027; B64C 2201/042;
(Continued)

(56) References Cited

U.S. PATENT DOCUMENTS 2,131,528 A  *  9/1938  Soyer .................... B64C 35/003
                                                    244/107
3,603,535 A  *  9/1971  DePolo ................... B60R 21/16
                                                    244/121
(Continued)

FOREIGN PATENT DOCUMENTS

DE         100 21 845 A1    11/2001
JP         8-192797 A        7/1996
(Continued)

OTHER PUBLICATIONS

International Search Report (PCT/ISA/210) issued in PCT/JP2017/029349, dated Sep. 26, 2017.
(Continued)

*Primary Examiner* — Medhat Badawi
(74) *Attorney, Agent, or Firm* — Birch, Stewart, Kolasch & Birch, LLP

(57) ABSTRACT

A small flying vehicle flown by radio control or autonomously by an auto pilot is equipped with an airbag device. The small flying vehicle has a main body part including a controller and a battery, a frame, a propeller, a motor, and a transmitting and receiving antenna. The airbag device has a gas supplier, a sensor, a controller, and an airbag. The airbag device is attached to the main body part, and the gas supplier is provided with a gas cylinder that releases a compressed gas when a closure member sealing the gas cylinder is broken, a breaker, including an electric igniter, that breaks the closure member, and introduction device that introduces (Continued)

the gas discharged from the gas cylinder and providing the pressurized gas into the airbag to inflate the airbag.

7 Claims, 5 Drawing Sheets

(52) U.S. Cl.
CPC .. *B64C 2201/027* (2013.01); *B64C 2201/042* (2013.01); *B64C 2201/108* (2013.01); *B64C 2201/127* (2013.01); *B64C 2201/141* (2013.01)

(58) Field of Classification Search
CPC ........ B64C 2201/108; B64C 2201/127; B64C 2201/14; B64C 2201/141; B64C 39/024; B64D 2201/00; B64D 25/00; B64D 45/00; B64D 47/08
See application file for complete search history.

(56) References Cited

U.S. PATENT DOCUMENTS

| | | | | |
|---|---|---|---|---|
| 3,727,716 A * | 4/1973 | Jenkins | ............... | B60V 3/08 180/124 |
| 3,738,597 A * | 6/1973 | Earl | ............... | B64C 25/56 244/100 A |
| 3,964,698 A * | 6/1976 | Earl | ............... | B60V 3/08 244/100 A |
| 3,981,462 A * | 9/1976 | Berezhnoi | ............... | B60V 3/08 244/100 A |
| 3,990,658 A * | 11/1976 | Letsinger | ............... | B60V 3/08 244/100 A |
| 4,004,761 A * | 1/1977 | McAvoy | ............... | B60V 3/08 244/100 A |
| 4,032,088 A * | 6/1977 | McAvoy | ............... | B60V 3/08 244/100 A |
| 4,657,516 A * | 4/1987 | Tassy | ............... | B64D 25/00 280/729 |
| 5,259,574 A * | 11/1993 | Carrot | ............... | B64C 25/56 244/100 A |
| 5,356,097 A * | 10/1994 | Chalupa | ............... | B64D 25/12 244/100 A |
| 5,560,568 A * | 10/1996 | Schmittle | ............... | B64C 3/385 244/48 |
| 5,765,778 A * | 6/1998 | Otsuka | ............... | B64C 25/56 244/100 A |
| 5,836,544 A * | 11/1998 | Gentile | ............... | B64D 25/00 244/17.17 |
| 5,992,794 A * | 11/1999 | Rotman | ............... | B64C 25/32 244/138 R |
| 6,338,456 B1 * | 1/2002 | Cairo-Iocco | ............... | B64C 25/30 244/100 A |
| 6,886,776 B2 * | 5/2005 | Wagner | ............... | B64C 27/20 244/12.4 |
| 7,644,739 B1 * | 1/2010 | Vezzosi | ............... | B64C 25/56 141/67 |
| 7,875,989 B2 * | 1/2011 | Morris | ............... | H02J 1/10 290/40 B |
| 8,123,162 B2 * | 2/2012 | Sirkis | ............... | B64C 39/024 244/100 A |
| 8,565,981 B2 * | 10/2013 | Filias | ............... | B64C 25/56 701/45 |
| 8,588,996 B2 * | 11/2013 | Hill | ............... | G05D 1/0055 701/3 |
| 8,979,023 B1 * | 3/2015 | Wang | ............... | B64D 45/00 244/100 A |
| 9,452,843 B1 * | 9/2016 | Lu | ............... | B64D 25/00 |
| 2006/0043712 A1 * | 3/2006 | Hakki | ............... | B60R 19/205 280/735 |
| 2006/0249629 A1 * | 11/2006 | Lee | ............... | B64D 17/80 244/139 |
| 2007/0145193 A1 * | 6/2007 | Hakki | ............... | B64D 25/08 244/139 |
| 2008/0154495 A1 * | 6/2008 | Breed | ............... | G01C 21/20 701/472 |
| 2009/0085335 A1 * | 4/2009 | Yabuta | ............... | B60R 21/268 280/736 |
| 2010/0044507 A1 * | 2/2010 | Smith | ............... | B64D 25/18 244/110 R |
| 2010/0094508 A1 * | 4/2010 | Kozyreff | ............... | B60R 21/0134 701/45 |
| 2010/0206983 A1 * | 8/2010 | Tho | ............... | B64D 25/00 244/100 A |
| 2011/0204181 A1 * | 8/2011 | Hill | ............... | B64D 25/00 244/100 A |
| 2011/0226898 A1 * | 9/2011 | Smith | ............... | B64D 25/00 244/100 A |
| 2011/0240800 A1 * | 10/2011 | Fox, Jr. | ............... | B64D 1/14 244/138 R |
| 2011/0315806 A1 * | 12/2011 | Piasecki | ............... | B64D 17/80 244/2 |
| 2013/0062465 A1 * | 3/2013 | Hill | ............... | B64D 25/00 244/100 A |
| 2014/0208975 A1 * | 7/2014 | Kobayashi | ............... | B60R 21/272 102/530 |
| 2014/0230685 A1 * | 8/2014 | Hanano | ............... | B60R 21/2644 102/530 |
| 2015/0107477 A1 * | 4/2015 | Heigl | ............... | B29C 65/16 102/202.5 |
| 2016/0001893 A1 | 1/2016 | Wang | | |
| 2016/0052481 A1 * | 2/2016 | Yamauchi | ............... | F42B 3/121 102/530 |
| 2016/0264092 A1 * | 9/2016 | Kobayashi | ............... | B60R 21/272 |
| 2016/0332739 A1 * | 11/2016 | Wong | ............... | B64D 25/00 |
| 2017/0036901 A1 * | 2/2017 | Kuroda | ............... | B67B 7/92 |
| 2017/0043743 A1 | 2/2017 | Kobayashi et al. | | |

FOREIGN PATENT DOCUMENTS

| | | |
|---|---|---|
| JP | 2003-25951 A | 1/2003 |
| JP | 2009-514740 A | 4/2009 |
| JP | 2009-208674 A | 9/2009 |
| JP | 2015-62545 A | 4/2015 |
| JP | 2015-223962 A | 12/2015 |
| JP | 2016-518286 A | 6/2016 |
| KR | 10-1630207 B1 | 6/2016 |
| WO | WO 02/070309 A1 | 9/2002 |
| WO | WO 2008/054401 A2 | 5/2008 |

OTHER PUBLICATIONS

Written Opinion (PCT/ISA/237) issued in PCT/JP2017/029349, dated Sep. 26, 2017.
Extended European Search Report dated Apr. 6, 2020, in European Patent Application No. 17846124.0.
English translation of International Preliminary Report on Patentability and Written Opinion dated Mar. 14, 2019, in PCT/JP2017/029349 (Forms PCT/IB/326, PCT/IB/373, and PCT/ISA/237).
International Search Report dated Sep. 26, 2017, in PCT/JP2017/029349.

* cited by examiner

[Fig.1]
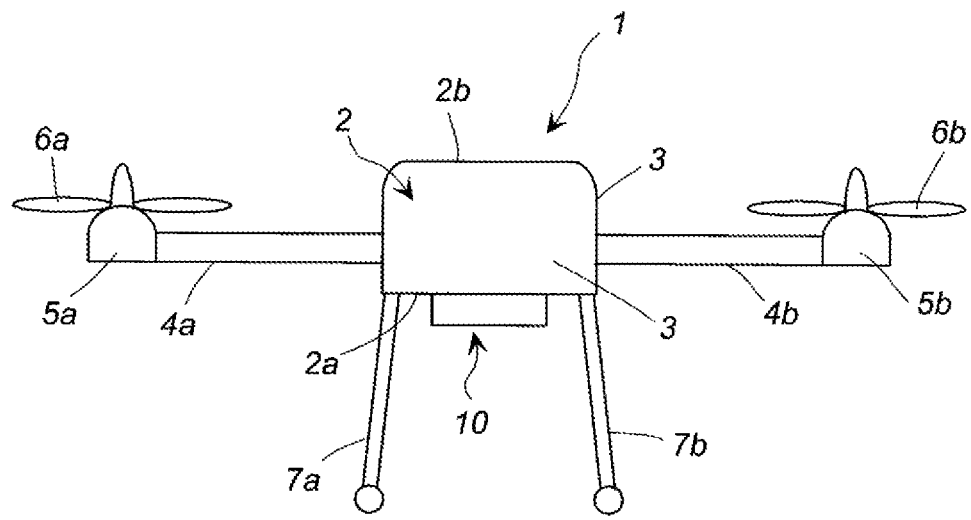
[Fig.2]
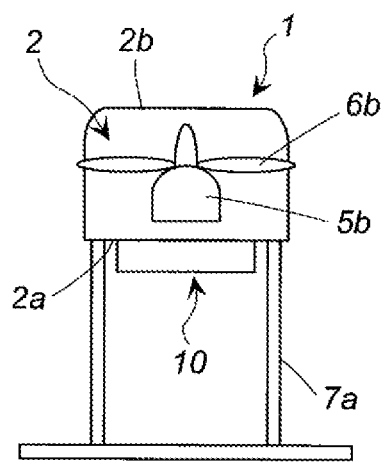

[Fig. 3]
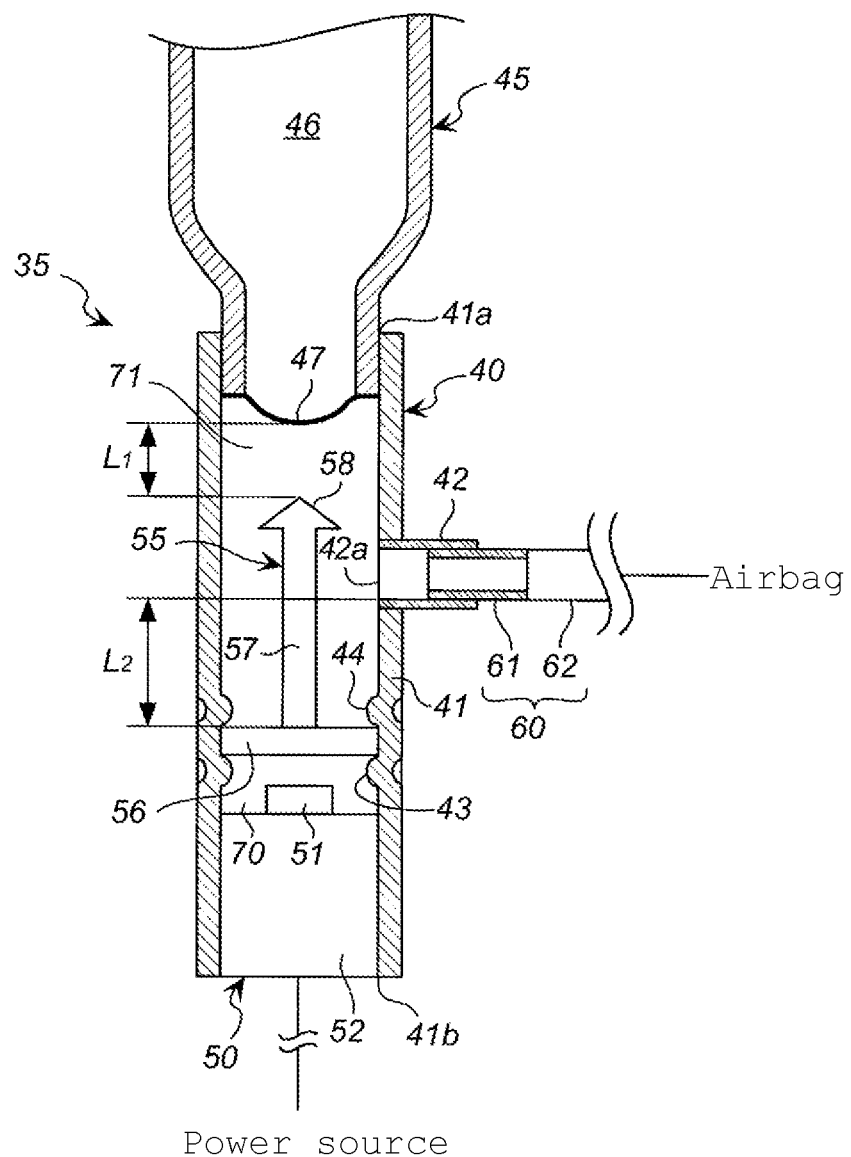

[Fig. 4]
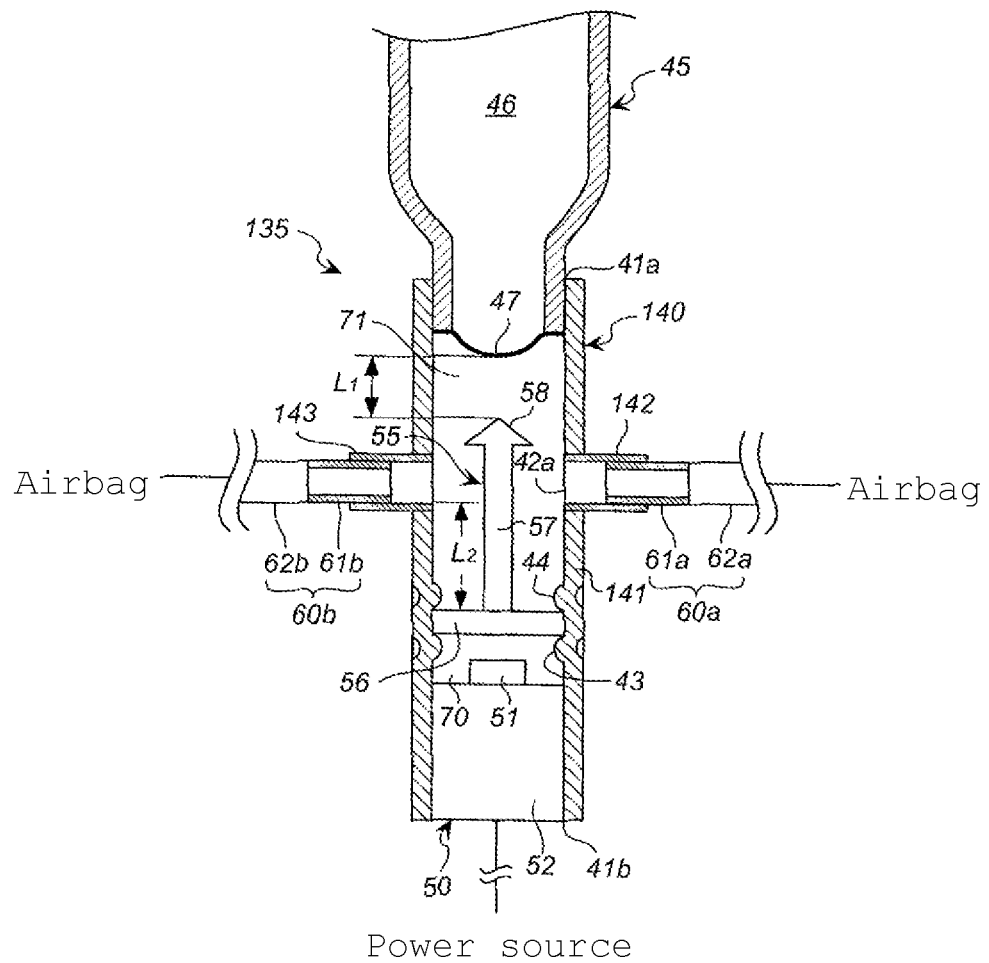
[Fig. 5]
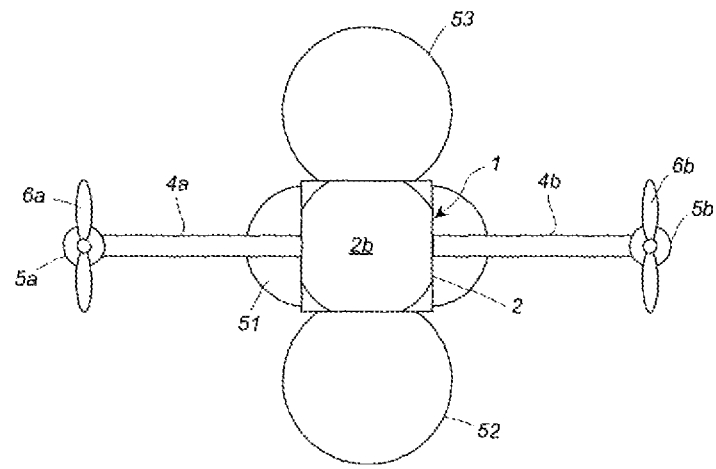

[Fig. 6]
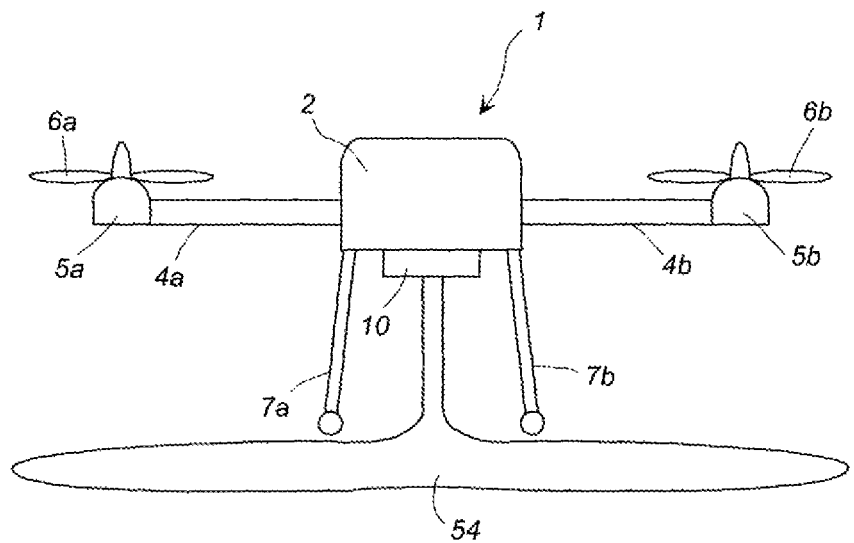
[Fig. 7]
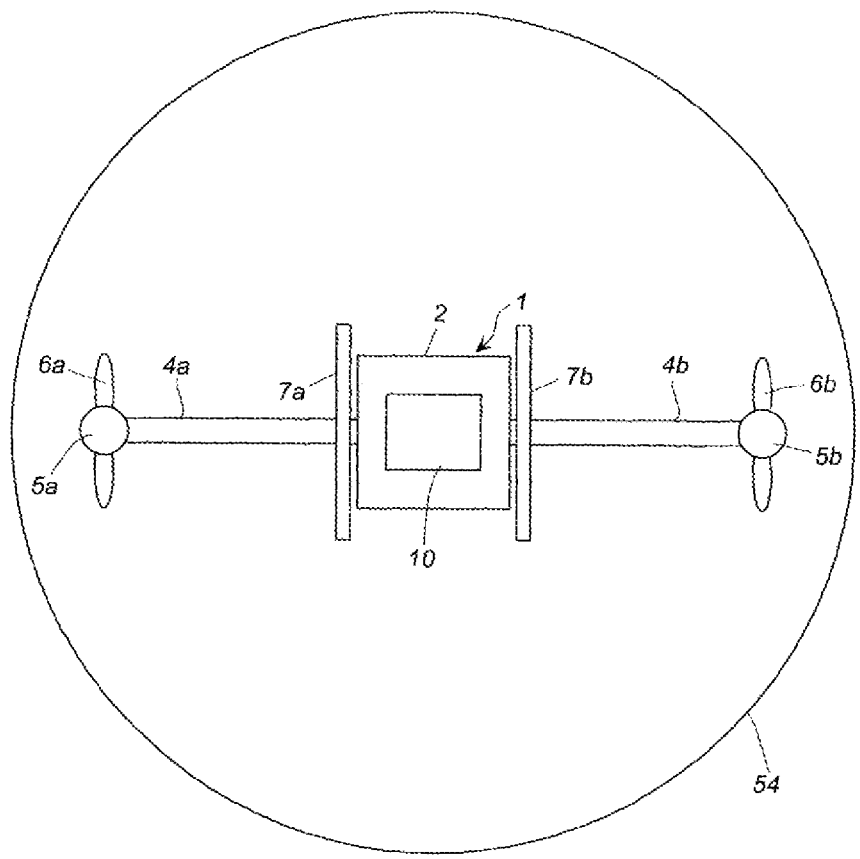

[Fig. 8]
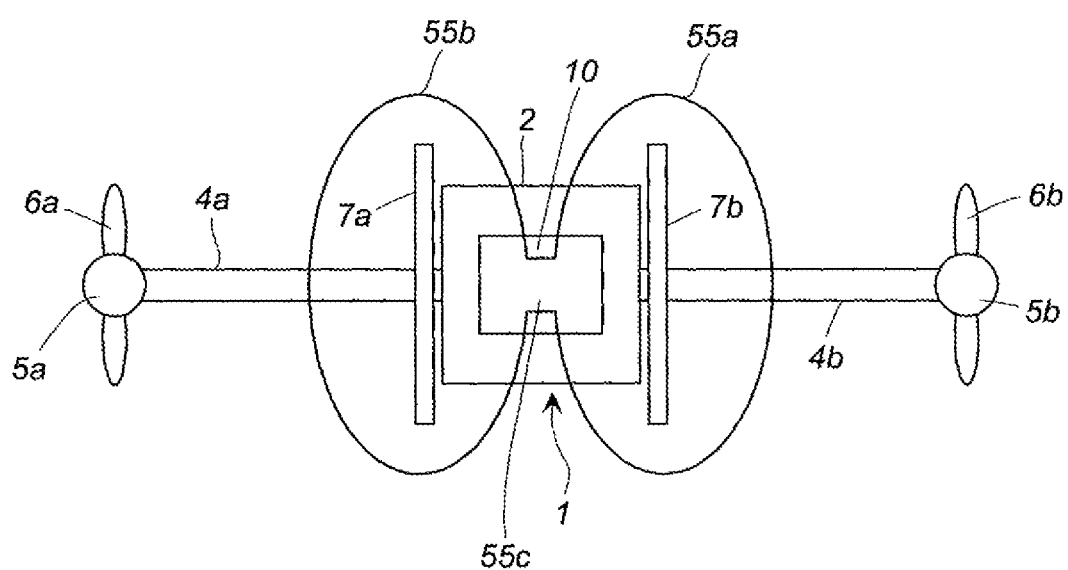

SMALL FLYING VEHICLE EQUIPPED WITH AIRBAG DEVICE

FIELD OF THE INVENTION

The present invention relates to a small flying vehicle equipped with an airbag device.

BACKGROUND OF THE INVENTION

Small flying vehicles (so-called drones) that can fly by radio control or autonomously fly by autopilot are used in various fields. For example, they are used for photographing areas difficult to approach or enter, including disaster sites, volcanoes, mountains, forests, deserts, oceans, lakes, rivers, and various buildings, from lower altitude.

When a drone is used for such photographing purposes, an expensive imaging device, such as a video camera, and a data transmission device will be attached to the drone. In this case, if the drone crashes and collides with the ground, standing trees, buildings or the like due to an accident, not only the drone itself but also the imaging device and valuable recorded data may be damaged. Further, there will be a danger of damaging a facility or equipment at the spot where the drone has crashed, or causing injury if any person is present at the falling point. In addition, when the drone crashes into a lake or the like, there will be a risk of not being able to collect the imaging device or the like due to submergence.

As disclosed in JP-A 8-192797, JP-A 2009-514740, and JP-A 2009-208674, there are inventions relating to large flying vehicles equipped with airbags (balloons) and parachutes.

SUMMARY OF THE INVENTION

The present invention intends to provide a small flying vehicle capable of mitigating the damage to a facility or equipment or any person at the falling point and the shock applied to drone itself, when falling and colliding with the ground or the like.

The present invention provides a small flying vehicle equipped with an airbag device, capable of flying by radio control or autonomously flying by autopilot, and having a maximum length of 2 m or less, wherein the small flying vehicle has a main body part including a controller and a battery, a frame, a propeller, a motor, and a transmitting and receiving antenna, the airbag device has gas supply means and an airbag and is attached to the main body part, either the main body part or the airbag device further includes a sensor and a control device, and the gas supply means is provided with a gas cylinder capable of releasing an internal pressurized gas when a closure member is broken and opened, breaking means including an electric igniter for opening the closure member of the gas cylinder, and introduction means for introducing the pressurized gas in the gas cylinder into the airbag to inflate the airbag.

Since the small flying vehicle (drone) according to the present invention is equipped with an airbag device, in the case of crashing and colliding with the ground, standing trees, buildings, or the like due to an accident, it is possible to mitigate the shock at the time of collision by inflating and deploying the airbag. Therefore, even when an expensive imaging device, a data transmission device, and the like are attached to the small flying vehicle, these devices can be protected and prevented from being damaged. Even when a facility or equipment or any person is present at the falling point, the damage can be reduced.

BRIEF DESCRIPTION OF DRAWINGS

FIG. 1 is a diagram illustrating a front view of a small flying vehicle equipped with an airbag device.

FIG. 2 is a diagram illustrating a side view of the small flying vehicle, seen from one side of FIG. 1.

FIG. 3 is a diagram illustrating a longitudinal cross-sectional view of gas supply means to be used in the airbag device.

FIG. 4 is a diagram illustrating a longitudinal cross-sectional view of gas supply means according to an embodiment different from the one illustrated in FIG. 3.

FIG. 5 is a diagram illustrating a plan view of the small flying vehicle in a state where the airbag is deployed.

FIG. 6 is a diagram illustrating a front view of the small flying vehicle in a state where an airbag according to another embodiment is deployed.

FIG. 7 is a diagram illustrating a plan view of the small flying vehicle illustrated in FIG. 6, seen from a lower side thereof (from the airbag side), in which a portion concealed by the airbag is also indicated by a solid line so that a positional relationship can be understood.

FIG. 8 is a diagram illustrating a plan view of the small flying vehicle in a state where an airbag according to yet another embodiment is deployed, seen from a lower side thereof (from the airbag side), in which a portion concealed by the airbag is also indicated by a solid line so that a positional relationship can be understood.

EMBODIMENTS OF THE INVENTION

A small flying vehicle according to the present invention can fly by radio control or autonomously fly by autopilot and has a maximum length of 2 m or less, which is generally referred to as a drone. The maximum length is a length of the longest part of the small flying vehicle and is, for example, the length between two propellers 6a and 6b in FIG. 1.

The small flying vehicle has a main body part including a controller and a battery, a frame, a propeller, a motor, and a transmitting and receiving antenna, and also has other necessary components that are different depending on the model. The controller and the battery may be accommodated in the main body part or may be exposed thereon. The frame may be directly or indirectly attached to the main body part or may be integrated with the main body part.

The transmitting and receiving antenna may be an antenna having both of transmission and reception functions, an antenna dedicated for reception, or an antenna with a reception antenna and a transmission antenna that are provided separately. The controller can receive a signal from the antenna and control the rotation of the motor and the like, and can provide feedback of the rotational speed of the motor and other operational states of the small flying vehicle.

FIGS. 1 and 2 illustrate one embodiment of a small flying vehicle 1, which has a main body part 2 including a controller and a battery, frames 4a and 4b extending symmetrically from the main body part, motors 5a and 5b attached to distal ends of these frames, and propellers 6a and 6b driven by these motors. The antenna is not illustrated.

Although there are two frames according to the small flying vehicle 1 illustrated in FIGS. 1 and 2, the number of the frames may be within a range of 2 to 10 or more. The number of the motors and the number of the propellers may be the same as that of the frames. The frames can extend symmetrically in radial directions, for example, from the main body part 2 serving as a center, or from four corners of the main body part 2 according to the illustrated example.

Further, the small flying vehicle 1 illustrated in FIGS. 1 and 2 has skid-type landing gears 7a and 7b attached to the main body part 2. The landing gears 7a and 7b may have other shapes such as wheels. Alternatively, the landing gears may be replaced with frames.

In one embodiment, an imaging device is attached to the main body part or the frame of the small flying vehicle according to the present invention. In the small flying body, for example, an imaging device such as a video camera or a camera may be attached, by use of other fitting components as needed, to the main body part 2, either one of the frames 4a and 4b, or both frames by straddling them. However, these configurations are not restrictive, and other articles may be attached to the small flying vehicle 1. The small flying vehicle may be used for transportation purposes.

Although a case 10 accommodating an airbag device is attached to a bottom surface 2a of the main body part 2, it may be attached to any one of four side surfaces 3. Alternatively, the case 10 may further be attached to an top surface 2b other than the bottom and side surfaces, or may be attached using a combination thereof. The case 10 may also be attached to the landing gears 7a and 7b by using other fitting components.

As the case 10, one similar to a module case for accommodating an airbag and an inflator mounted to an automotive vehicle can be used. In one embodiment, the airbag device has gas supply means, a sensor, a control device and a folded airbag. Each of the gas supply means, the sensor, and the control device is electrically connected to a power source (battery) via a conductor.

As the battery, one accommodated in the case 10 may be used, or a battery in the main body part 2 of the small flying vehicle 1 may be used. These batteries may also be general batteries, rechargeable batteries, or solar cells, and may be configured to be attachable and detachable.

At least one of the sensor and the control device may be attached to the main body part 2 of the small flying vehicle 1. Further, functions of the control device may be incorporated as part of controller functions of the small flying vehicle 1.

As the gas supply means illustrated in FIG. 3, gas supply means (first gas supply means) 35 similar to the pressurized gas supply means illustrated in FIG. 3 of JP-A 2015-62545 can be used. The first gas supply means 35 includes a trifurcate tube 40 made of a material such as aluminum or stainless steel, which is composed of a main pipe 41 having openings provided at both ends thereof, and one branch pipe 42 vertically branched from a peripheral surface of the main pipe 41, namely in a direction orthogonal to the main pipe 41.

In one embodiment, an opening portion including a closure member 47 of a gas cylinder 45 is connected to one end opening 41a of the main pipe 41. The main pipe 41 and the gas cylinder 45 may be connected by welding, or may be connected by screwing the gas cylinder 45 into the one end opening 41a of the main pipe 41.

An inert gas such as argon, helium, nitrogen, and carbon dioxide is pressurized and filled in an interior space 46 of the gas cylinder 45. The filling amount of the gas is such that at least the airbag to be used can be fully inflated. In one embodiment, the opening of the gas cylinder 45 is closed with the circular closure member 47. The closure member 47 is deformed into a bowl shape under the pressure of the interior space 46.

In one embodiment, breaking means is connected to the other end opening 41b of the main pipe 41. The breaking means may be composed of an electric igniter 50 equipped with an ignition agent; and a flying body 55 for advancing straight on receiving a flame or a shock wave of combustion products due to activation of the electric igniter 50 to break and open the closure member 47.

As the electric igniter 50, one similar to an electric igniter used for a gas generator of a known airbag device can be used. It is preferred to use ZPP (a mixture containing zirconium and potassium perchlorate) or THPP (a mixture containing titanium hydride and potassium perchlorate) as the ignition agent because of its high sensitivity. If necessary, a gas generation agent may be accommodated in a space 70 between the electric igniter 50 and the flying body 55.

The electric igniter 50 may be composed of an igniter holder 52 made of metal and resin materials and an igniter main body 51 surrounded and held by the igniter holder 52. The electric igniter 50 may be connected by calking the other end opening 41b of the main pipe 41, or may be connected by screwing the igniter holder 52 into the other end opening 41b or by using any other means.

In one embodiment, the flying body 55 is composed of a disk portion 56, a shaft portion 57 vertically provided from the center of the disk portion 56, and an arrowhead portion (an acute portion) 58 formed at a distal end of the shaft portion 57. The acute portion is not limited to the arrowhead portion 58 and may be a rod-like member whose tip is cut diagonally with respect to the axial direction (for example, one having a bamboo spear shape).

The flying body 55 is disposed in the main pipe 41 in such a manner that the disk portion 56 is positioned on the side of the electric igniter 50 and the arrowhead portion 58 is positioned on the side of the closure member 47. A tip of the arrowhead portion 58 is disposed so as to be positioned further toward the closure member 47 than an opening 42a of the branch pipe 42 connected to the main pipe 41. More specifically, the arrowhead portion 58 is closer to the closure member 47 than the opening 42a.

$L_1$ represents the distance between the tip of the arrowhead portion 58 and the closure member 47 and $L_2$ represents the distance between the disk portion 56 and the opening 42a. In one embodiment, the flying body 55 is disposed in the main pipe 41 so as to satisfy a relationship of $L_1<L_2$. When the tip of the arrowhead portion 58 moves by the distance $L_1$ and collides with the closure member 47, the disk portion 56 moves by the same distance $L_1$. However, because of the relationship of $L_1<L_2$, the disk portion 56 is positioned on the side of the electric igniter 50 from the opening 42a of the branch pipe 42. More specifically, the arrangement of the flying body 55 is adjusted in such a manner that the disk portion 56 cannot reach the opening 42a at the time of activation.

If the disk portion 56 reaches and comes into contact with the opening 42a of the branch pipe 42 before the tip of the arrowhead portion 58 collides with the closure member 47, there is a risk of the tip of the arrowhead portion 58 not colliding with the central point of the closure member 47. However, since there is the relationship of $L_1<L_2$, the above-mentioned risk can be negated. In addition, there is no risk that the opening 42a is closed by the disk portion 56.

In order to surely break the closure member 47 with the flying body 55 at the time of activation, it is preferred that the flying body 55 can advance straight in the main pipe 41 on receiving the shock wave due to the activation of the electric igniter 50, and the tip of the arrowhead portion 58 can collide with the central point of the closure member 47. However, if the breakage is ensured, the collision may be located in the vicinity of the central point.

In order to ensure the above-mentioned operation, it is preferred that the outer diameter of the disk portion 56 is adjusted so as to be close to the inner diameter of the main pipe 41 (the outer diameter of the disk portion 56<the inner diameter of the main pipe 41, while close to each other), so that the main pipe 41 can function as a guide member.

Further, in addition to the function for guiding the disk portion 56, arranging the flying body 55 so as to satisfy the above-mentioned relationship of $L_1<L_2$ makes it easy to break the closure member 47 with the flying body 55.

To prevent the flying body 55 from moving in the axial direction when not activating, two convex portions 43 and 44 are formed on an inner peripheral surface of the main pipe 41 with an interval provided therebetween in the axial direction, so that the disk portion 56 can be positioned between these convex portions 43 and 44. Each of the convex portions 43 and 44 has a smaller protrusion height. Therefore, at the time of assembling, the flying body 55 can be inserted into the main pipe 41 by press fitting the flying body 55 from the side of the other end opening 41b with a smaller force. The convex portions 43 and 44 do not hinder the movement of the flying body 55 (the disk portion 56) at the time of activation.

As an additional configuration, an elastic member such as a spring may be used to urge the flying body 55 toward the side of the igniter 50 before activation, and to return the flying body to the side of the igniter 50 with its spring force also after the activation. Alternatively, instead of using the flying body 55, a gas generation agent may be accommodated in an internal space 71 of the main pipe 41 and used as breaking means.

Introduction means 60 is connected to the branch pipe 42. The introduction means 60 introduces a pressurized gas from the gas cylinder to the airbag.

In one embodiment, as illustrated in FIG. 3, the introduction means 60 is composed of a flexible tube 62 and a mouth ring 61 provided at an end of the flexible tube 62. The mouth ring 61 is connected to the main pipe 41 by being screwed into the branch pipe 42. The flexible tube 62 is a tube made of a flexible material, such as a resin or a rubber, and is connected to the airbag.

In another embodiment of the present invention, the small flying vehicle has plural pieces of introduction means and a plurality of airbags whose total number is the same as the number of pieces of the introduction means. According to one example, the first gas supply means 35 illustrated in FIG. 3 may be replaced by second gas supply means 135 illustrated in FIG. 4.

The second gas supply means 135 illustrated in FIG. 4 includes a trifurcate tube 140 made of a material such as aluminum or stainless steel. The trifurcate tube 140 is composed of a main pipe 141 and two branch pipes of a first branch pipe 142 and a second branch pipe 143, which are vertically branched from a peripheral surface of the main pipe 141, namely in an orthogonal direction with respect to the main pipe 141. According to the illustrated example, the first branch pipe 142 and the second branch pipe 143 are disposed at positions opposing in the diameter direction of the main pipe 141.

First introduction means 60a is connected to the first branch pipe 142. As illustrated in FIG. 4, the first introduction means 60a is composed of a first flexible tube 62a and a first mouth ring 61a provided at an end of the first flexible tube 62a.

The first mouth ring 61a is connected to the main pipe 141 by being screwed into the first branch pipe 142. The first flexible tube 62a is a tube made of a flexible material, such as a resin or a rubber, and is connected to an airbag.

Second introduction means 60b is connected to the second branch pipe 143. As illustrated in FIG. 4, the second introduction means 60b is composed of a second flexible tube 62b and a second mouth ring 61b provided at an end of the second flexible tube 62b.

The second mouth ring 61b is connected to the main pipe 141 by being screwed into the second branch pipe 143. The second flexible tube 62b is a tube made of a flexible material, such as a resin or a rubber, and is connected to an airbag. The rest of the configuration is similar to that of the first gas supply means 35 illustrated in FIG. 3.

The first gas supply means 35 illustrated in FIG. 3 is configured to inflate and deploy one airbag. On the other hand, the second gas supply means 135 illustrated in FIG. 4 can inflate and deploy two airbags.

Further, instead of using the first gas supply means 35 or the second gas supply means 135, third gas supply means having three branch pipes (a first branch pipe, a second branch pipe, and a third branch pipe) and a plurality of related members may be used for inflating and deploying three airbags.

Alternatively, instead of using the second gas supply means 135 or the third gas supply means, the flexible tube 62 of the first gas supply means 35 may be replaced with a bifurcate tube or a trifurcate tube to connect two airbags or three airbags, respectively.

Although not illustrated, the main body part or the airbag device of the small flying vehicle according to the present invention has a sensor. This sensor is for operating the airbag device in cooperation with the control device (not illustrated) that is provided in the main body part or the airbag device, and examples of the sensor that can be used include a velocity sensor for detecting the fall velocity when the small flying vehicle 1 is falling in an abnormal flying state, an angle sensor for detecting the angle of the small flying vehicle 1 at the time of flight, and other known sensors.

In addition to the control based on the sensor, the airbag device may be configured to be manually controlled according to an instruction of an operator. As the control device (CPU), one used for a known airbag device mounted to an automotive vehicle or the like can be used. Further, as mentioned above, the control device may be part of the controller of the small flying vehicle 1.

As the airbag, any airbag used for a known airbag device mounted to an automotive vehicle or the like can be used. However, unlike the airbags of known airbag devices, no vent port is provided for discharging the gas.

The shape of the airbag at the time of inflation and deployment is not particularly limited and can be appropriately selected according to the structure and shape of the small flying vehicle 1. For example, it may be a spherical shape, a disc-like shape (being circular in a planer shape), an elliptical plate shape (being elliptical in planer shape), a polygonal plate state (being polygonal in planer shape), an eggplant-like shape, a rod-like shape, a floating ring shape, a boat shape, or any combination of the above-mentioned shapes in which two or more airbags are connected at one point or two or more points (for example, a shape like a catamaran or a trimaran of a yacht).

If necessary, the small flying vehicle 1 according to the present invention can be equipped with a parachute device attached to the main body part or the frame. The parachute device is usable as an auxiliary device of the airbag device for decelerating the fall velocity of the small flying vehicle 1 when it falls. For this reason, the diameter of a parachute deploying at the time of activation is preferably comparable to the size of the main body part 2, or within a length range covering the main body part 2 and ⅓ of respective frames 4a and 4b extending symmetrically from the main body part 2. The activation of the parachute device may be interlocked with the airbag device, for example, by the above-mentioned control device, or may be separately instructed wirelessly.

Next, an operation of the small flying vehicle 1 at the time of activation of the airbag device will be described with reference to FIGS. 5 to 8.

FIG. 5 illustrates an embodiment using an airbag device having three airbags 51, 52, and 53, although the airbag device may have the airbag 51 only or two of the airbags 52 and 53. FIG. 5 illustrates a state where all the three airbags 51, 52, and 53 are deployed.

Turning on a switch of the power source brings the airbag device in the case 10 into a state where the sensors, the control device, and the pressurized gas supply means (the electric igniter) are operable. When the airbag device has only one airbag 51, the gas supply means 35 illustrated in FIG. 3 can be used. When the airbag device has two airbags 52 and 53, the gas supply means 135 illustrated in FIG. 4 can be used. When the airbag has three airbags 51 to 53, the third gas supply means can be used.

In the following description, the case where the airbag device has only the airbag 51 is chiefly described.

When the small flying vehicle 1 is brought into a state where it crashes and collides with the ground or the like due to a failure or the like, the sensor detects an abnormality and sends a signal to the control device. The electric igniter 50 of the first gas supply means 35 (or the second gas supply means 135 or the third gas supply means) activates in response to a command from the control device.

The activation of the electric igniter 50 produces combustion products (a flame, a shock wave, and the like) of the ignition agent, which collide with the disk portion 56 of the flying body 55. Therefore, the flying body 55 advances straight in the main pipe 41 and collides with the center of the closure member 47, thereby surely breaking the closure member 47. When the closure member 47 is broken and opened, the pressurized gas filling the gas cylinder 45 is discharged therefrom, enters the trifurcate tube 40, and flows into the airbag 51 via the branch pipe 42 to inflate and deploy the airbag 51.

Using the second gas supply means 135 can inflate and deploy the airbags 52 and 53. Using the third gas supply means can inflate and deploy the airbags 51 to 53.

Although the examples illustrated in FIGS. 3 and 4 use the flying body 55 to break the closure member 47, it may be replaced with gas supply means using the above-mentioned gas generation agent or having a breaking structure with only the electric igniter 50 (for example, the one illustrated in FIG. 1 of JP-A 2003-25951).

The time from the abnormality detection by the sensor to the inflation of the airbag 51 caused by the activation of the electric igniter 50 can be set to several tens of milliseconds to several seconds. However, it is preferred to adjust the inflation time of the airbag 51 according to the shape and size of the small flying vehicle 1 and further, according to a portion where mitigation of the shock is mainly required. For example, the activation time is preferably 30 milliseconds or more, more preferably 50 milliseconds or more, and further preferably 80 milliseconds or more; and is preferably 2 seconds or less, more preferably 1.5 seconds or less, and further preferably 1.2 seconds or less.

Accordingly, as the shock when the small flying vehicle 1 collides with the ground or the like is mitigated, not only damage to the small flying vehicle 1 itself can be reduced but also damage to the imaging device or the like can be prevented. In addition, when the small flying vehicle 1 crashes into the sea, lake, river, or the like, the small flying vehicle 1 itself can be kept in a floated state.

When the second gas supply means 135 or the third gas supply means is used, the airbags 52 and 53 or the airbag 51 to 53 can be inflated and deployed so that the shock mitigation effect and the buoyant force can be further enhanced. The total airbag capacity may be the same or different between the case of using only one airbag and the case of using a plurality of airbags.

FIGS. 6 and 7 illustrate an embodiment in which airbag 54 is used as an airbag whose planer shape when inflating and deploying becomes a circular plate. FIG. 8 illustrates an embodiment in which two airbags 55a and 55b are connected by connection part 55c so as to serve an airbag whose planer shape when inflated and deployed becomes a shape similar to two trunks of a catamaran. Alternatively, an airbag inflating and deploying so as to wrap the main body part 2 can also be used.

INDUSTRIAL APPLICABILITY

The small flying vehicle according to the present invention can also be used for aerial photographing at various places, spraying of agricultural chemicals, transportation of parcels, and the like.

REFERENCE SIGNS LIST

1 small flying vehicle
2 main body part
4a, 4b frames
5a, 5b motors
6a, 6b propellers
35, 135 gas supply means
40, 140 trifurcate tubes
45 gas cylinder
50 electric igniter
51 to 54, 55a, 55b airbags

The invention claimed is:

1. A flying vehicle flown by a radio control or autonomously by an autopilot, the flying vehicle, comprising:
   a main body part including a controller that controls the flying vehicle, a battery, a frame, a propeller, a motor, and a transmitting and receiving antenna;
   an airbag device having a gas supplier and a plurality of airbags attached to the main body part and inflated by a gas supplied by the gas supplier;
   one of the main body part and the airbag device further including a sensor detecting a predetermined flying state of the flying vehicle, and an airbag controller;
   the gas supplier including a gas cylinder storing a pressurized gas, a closure member sealing the pressurized gas inside the gas cylinder, a breaker including an electric igniter breaking the closure member when the sensor detects the predetermined flying state of the flying vehicle to discharge the pressurized gas from the gas cylinder, and the gas supplier including a plurality of introduction passages including a first introduction passage connected to one of the plurality of airbags, and a second introduction passage connected to another one of the plurality of airbags, wherein the breaker has a main pipe and two branch pipes including a first branch pipe and a second branch pipe that are vertically branched from a peripheral surface of the main pipe, the first introduction passage is connected to the first branch pipe, wherein the first introduction pipe is composed of a first mouth ring connected to the first branch pipe and a first flexible tube connected to the first mouth ring, and wherein an end of the first flexible tube opposite to the end connected to the first mouth ring is connected to the one of the plurality of airbags, the second introduction passage is connected to the second branch pipe, wherein the second introduction pipe is composed of a second mouth ring connected to the second branch pipe and a second flexible tube connected to the second mouth ring, and wherein an end of the second flexible tube opposite to the end connected to the second mouth ring is connected to the another one of the plurality of airbags.

2. The flying vehicle according to claim 1, wherein the one of the plurality of airbags and the another one of the plurality of airbags form a shape of a catamaran of a yacht when inflated.

3. A flying vehicle flown by a radio control or autonomously by an autopilot, the flying vehicle, comprising:

a main body part including a controller that controls the flying vehicle, a battery, a frame, a propeller, a motor, and a transmitting and receiving antenna;

an airbag device having a gas supplier and a plurality of airbags attached to the main body part and inflated by a gas supplied by the gas supplier;

one of the main body part and the airbag device further including a sensor detecting a predetermined flying state of the flying vehicle, and an airbag controller;

the gas supplier including a gas cylinder storing a pressurized gas, a closure member sealing the pressurized gas inside the gas cylinder, a breaker including an electric igniter breaking the closure member when the sensor detects the predetermined flying state of the flying vehicle to discharge the pressurized gas from the gas cylinder, and the gas supplier including a plurality of introduction passages including a first introduction passage connected to one of the plurality of airbags, a second introduction passage connected to another one of the plurality of airbags, and a third introduction passage connected to yet another one of the plurality of airbags, wherein the breaker has a main pipe and three branch pipes including a first branch pipe, a second branch pipe, and a third branch pipe that are vertically branched from a peripheral surface of the main pipe, the first introduction passage is connected to the first branch pipe, wherein the first introduction passage is composed of a first mouth ring connected to the first branch pipe and a first flexible tube connected to the first mouth ring, and wherein an end of the first flexible tube opposite to the end connected to the first mouth ring is connected to the one of the plurality of airbags, the second introduction passage is connected to the second branch pipe, wherein the second introduction pipe is composed of a second mouth ring connected to the second branch pipe and a second flexible tube connected to the second mouth ring, and wherein an end of the second flexible tube opposite to the end connected to the second mouth ring is connected to the another one of the plurality of airbags, and the third introduction passage is connected to the third branch pipe, wherein the third introduction passage is composed of a third mouth ring connected to the third branch pipe and a third flexible tube connected to the third mouth ring, and wherein an end of the third flexible tube opposite to the end connected to the third mouth ring is connected to the yet another one of the plurality of airbags.

4. The flying vehicle according to claim 3, wherein the one of the plurality of airbags, the another one of the plurality of airbags, and the yet another one of the plurality of airbags form a shape of a trimaran of a yacht when inflated.

5. A flying vehicle flown by a radio control or autonomously by an autopilot, the flying vehicle, comprising:

a main body part including a controller that controls the flying vehicle, a battery, a frame, a propeller, a motor, and a transmitting and receiving antenna;

an airbag device having a gas supplier and a plurality of airbags attached to the main body part and inflated by a gas supplied by the gas supplier;

one of the main body part and the airbag device further including a sensor detecting a predetermined flying state of the flying vehicle, and an airbag controller;

the gas supplier including a gas cylinder storing a pressurized gas, a closure member sealing the pressurized gas inside the gas cylinder, a breaker including an electric igniter breaking the closure member when the sensor detects the predetermined flying state of the flying vehicle to discharge the pressurized gas from the gas cylinder, and the gas supplier including an introduction passage connected to the plurality of airbags, wherein the plurality of airbags includes one of two airbags and three airbags, the breaker has a main pipe and a branch pipe that is vertically branched from a peripheral surface of the main pipe, the introduction passage is connected to the branch pipe, wherein the introduction passage is composed of a mouth ring connected to the branch pipe and a flexible tube connected to the mouth ring, and wherein the flexible tube is one of bifurcated and connected to the two airbags, and trifurcated and connected to the three airbags.

6. The flying vehicle according to claim 5, wherein the plurality of airbags includes two airbags, the flexible tube is bifurcated and connected to the two airbags, and the two airbags form a shape of a catamaran of a yacht when inflated.

7. The flying vehicle according to claim 5, wherein the plurality of airbags includes three airbags, the flexible tube is trifurcated and connected to the three airbags, and the three airbags form a shape of a trimaran of a yacht when inflated.

* * * * *